No. 762,436. PATENTED JUNE 14, 1904.
A. G. OSGOOD.
VALVE.
APPLICATION FILED SEPT. 29, 1902.
NO MODEL. 2 SHEETS—SHEET 2.
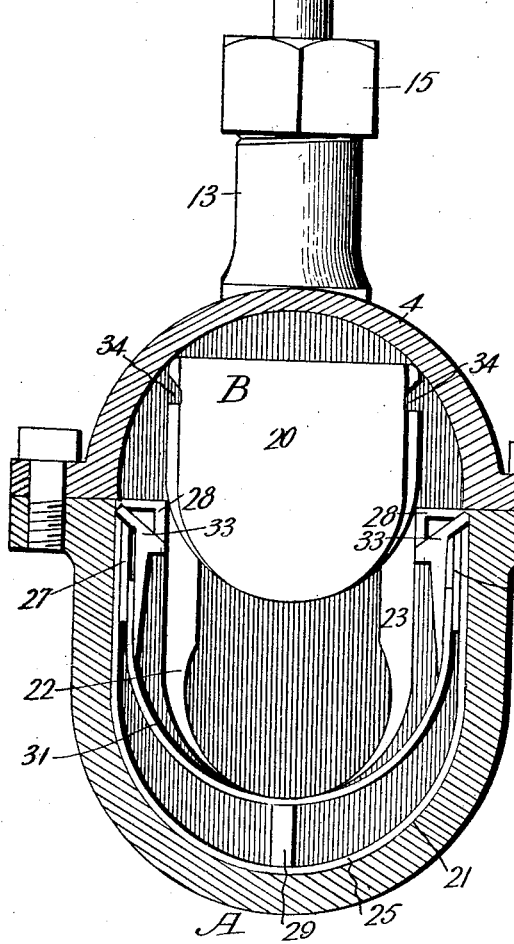
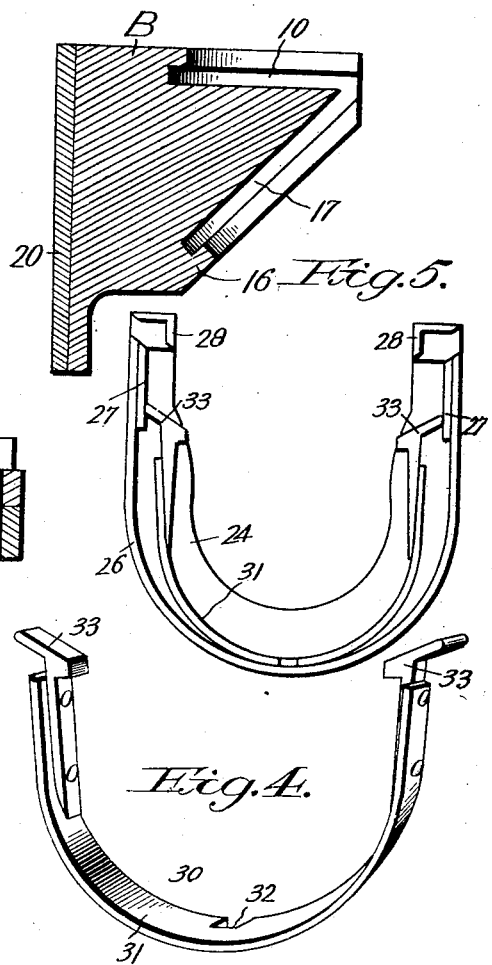
Witnesses
C. H. Walker.
Theodore Dalton.
Inventor
Alfred G. Osgood
by Chapin & Lee
Attorneys No. 762,436.

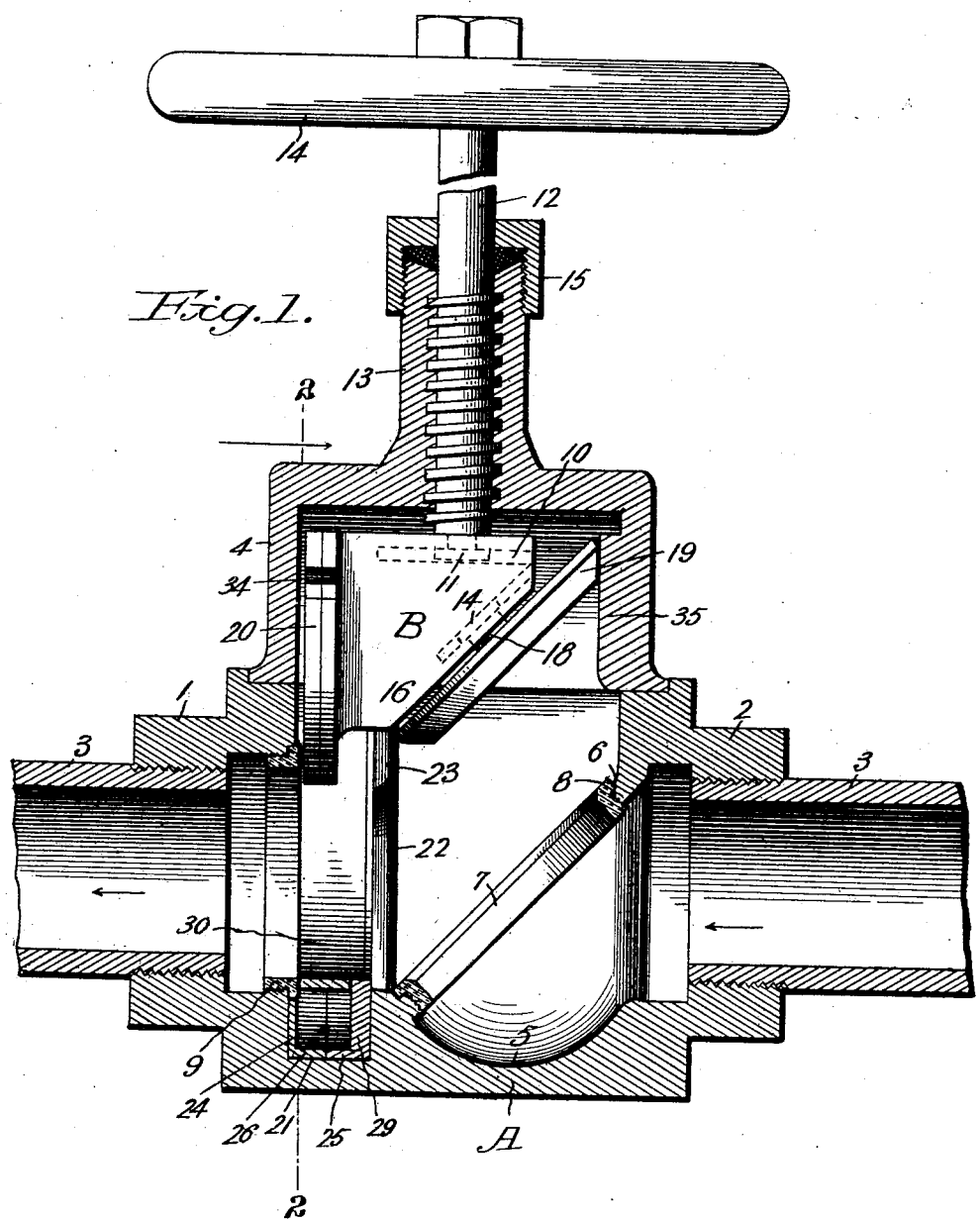

Patented June 14, 1904.

UNITED STATES PATENT OFFICE.

ALFRED G. OSGOOD, OF ATHOL, MASSACHUSETTS.

VALVE.

SPECIFICATION forming part of Letters Patent No. 762,436, dated June 14, 1904.

Application filed September 29, 1902. Serial No. 125,277. (No model.)

*To all whom it may concern:*

Be it known that I, ALFRED G. OSGOOD, a citizen of the United States of America, residing at Athol, in the county of Worcester and State of Massachusetts, have invented new and useful Improvements in Valves, of which the following is a specification.

My invention relates to improvements in straightway valves; and the objects are to improve and simplify the existing devices for cutting off and regulating the flow of water through conducting-pipes in which the device is interposed and arranged.

A further object is to provide such a device or apparatus with novel means for cleaning the valve-casing of sediment, debris, or impedimenta, the presence of which would prevent the free action or working of the valves.

A further object is to provide an implement, device, or apparatus of the kind named which is simple in construction, efficient in action, and durable in use, all as hereinafter will be fully specified, and the novelty thereof particularly pointed out and distinctly claimed.

The invention embodies a suitable casing adapted to be interposed between and secured to the approaching ends of mains, pipes, and similar conduits, seats formed in the casing, cleaning or clearing devices or mechanism, and valves or gates to open and close the mouth of the conduit-passages—

I have fully and clearly illustrated the invention in the annexed drawings, to be taken as a part of this specification, and wherein similar reference designations indicate like parts appearing in the several illustrations, and reference being had to said drawings—

Figure 1 is a central longitudinal vertical section through the device, showing the valve-seats, the valve-block, and associated valves and means for opening and closing them. Fig. 2 is a vertical section taken transversely through the valve-casing on the line 2 2 of Fig. 1, showing the valve-block raised and the cleaning or clearing member. Fig. 3 is a detail sectional view showing the valve-block and the channels in which the inclined gate and actuating-stem engage. Fig. 4 is a detail perspective view of the movable member of the clearing device. Fig. 5 is a view in elevation of the movable clearing device arranged in its casing in the lower position.

A designates the valve chamber or casing, of suitable capacity to meet the purposes intended and formed with end extensions 1 2, having interior screw-threads in which the threaded ends of the pipes 3 3 engage, as shown in the drawings. The upper face of the casing is plain and square, and fitted to the surface and suitably secured thereto is a cap-piece or head 4, having a chamber into which the valve lifts, as shown in Fig. 1 of the drawings. In the bottom of the casing is formed a dish-shaped or circular depression 5, affording a receptacle or trap for the deposition and retention of any substance which may find lodgment therein. Above the receptacle 5 is formed a circular flange 6, arranged at an incline coincident with the incline of the valve-plate which covers the water opening or passage and provided with internal screw-threads, with which the threaded perimeter of a ring 7 engages. The ring 7 is formed with an annular flange 8, which laps over and rests upon the upper face of the circular flange 6, as shown in the drawings in Fig. 1, and constitutes the seat for the inclined valve. The end of the valve-chamber opposite to the inclined valve-seat is vertical and planed smooth and formed with a suitable circular water-passage, the walls of which are provided with screw-threads, with which a threaded ring 9 engages and constitutes the valve-seat for the vertical valve-plate.

B designates the valve block or body, having at one end a vertical plane and an inclined surface at the other end. In the upper face of the valve-block is formed an open-end T-groove 10, in which a T-shaped foot 11, formed on the lower end of the valve-stem 12, engages. The valve-stem has threaded engagement in the vertical neck 13 of the head or cap 4, whereby the valve-block with the valves may be reciprocated in the usual manner. A hand-wheel 14 is fixed to the stem to operate the valves, and a threaded cap 15, with the valve-stem slidingly projected therethrough, engages over the upper end of the neck 13, as shown. In the inclined surface 16 is formed an open-end T-groove 17, in which the T-head 18, projecting from the back of the valve-plate 19, is detachably posited. The valve-plate 19 is made of brass or other suitable metal and fits down tight on the valve-ring 7 and closes the port or passage. On the vertical working end of the valve-block is secured a plate 20, made of brass or other proper metal. The plate 20 has the lower end rounded, as shown, so that it will make proper working engagement with the movable member of the clearing device and pass down into the circular recess or channel in the casing and close against the outer wall of the recess.

From the foregoing description, taken in connection with the illustrations, especially Fig. 1, it will be perceived that in the downward movement of the valve-block, the valve-plate 20 passes vertically in contiguity with the vertical end surface of the bushing or valve-ring 9, located in the mouth of the conduit 3, and that the inclined valve or plate moves downward at the same time; but because the rounded end of plate 20 extends a short distance farther down than the closing face of the inclined valve the mouth of the pipe 3 is closed by the plate 20 before the inclined valve is fully seated. Thus the pressure is taken off the inclined valve at the moment of its closing, and any sediment contained in the water will by reason of the impingement thereof against the inclined face of the valve be deposited in the trap 5 and by reason of the cup-shaped form of the latter be washed out when the valve is next opened. It will also be perceived that when the valve is lifted the force of the current will sweep any accumulation in the trap out and carry it through the pipes.

In the valve-casing contiguous to the vertical wall of the casing is formed a curved or circular channel 21, disposed transversely to the axis of the casing, and, as stated, into this channel the lower rounded end of the valve extends, and thus completely shuts off the water. Such channels or their equivalents are common in the art to receive the valve or the edge portion thereof, and under ordinary circumstances dirt, sand, or pebbles find their way into the channel and eventually result in preventing the full and complete closing of the valve and also grind and deface the face of the valve. To prevent detrimental deposition of debris in the channel and to remove such as may have found lodgment therein, I have devised and provided the following-described mechanism: The clearer or cleaner is lodged in said channel between the end of the casing and the inner wall of the channel, on which is formed a flange 22, the vertical side walls or extensions of which are broadened, as seen at 23, to extend inward and serve as guides and stays to prevent the valve-block from turning inward or assuming other displacement in operation and while being seated in its lower position.

Reference being made to the drawings, 24 25 designate a two-part U-shaped casing, the part 24 being made of a metal plate formed with an edge flange 26 at right angles to the body of the plate and locking-pieces 27, which extend beyond the edge of the flange 26 to engage against the inner faces of the companion part of the casing and hold the two sections in position in alinement. At the upper ends of the part 24 are formed angle-pieces 28, which extend over the mouth of the parts or sections, and at the outer part of the upper ends are formed lateral openings in which the inclined pieces or lugs of the movable member of the cleaner engage. The part or section 25 of the cleaner-casing consists of a counterpart in general conformation and sets or rests against the other, the distinction being that the part 25 has plain upper ends and in its central lower portion has a vertical guide-piece 29, which guides the vertical movements of the movable cleaning member.

30 designates the movable member, consisting of a bow-spring 31, having a guide-notch 32 at the middle, which takes in the guide-piece 29 of the cleaner-case. To the upper ends of the spring are formed or fastened inclined lugs 33, the outer parts of which snap through the lateral openings at the upper ends of the cleaner-casing and hold the cleaner in its upper position, and when the cleaner is moved down the outer ends of the lugs bear the arms of the spring inward and force the inner lugs into engagement with the recesses.

The inner and lower projections of the inclined lugs 33 are formed with square or abrupt under faces, so that when the valves are pushed down to their lower and closed position and carry the cleaner down on the movement the inner parts of the inclined lugs will engage in notches or recesses 34, made in the side edges of the vertical valve-plate 20, and thus held the cleaner will be drawn upward when the valves are lifted until the position is reached which brings the outer parts of the inclined lugs free to enter the lateral openings at the upper ends of the cleaner-casing, when the action of the spring will spread the lugs apart and release them from their hold in the valve and force them into engagement in the said openings, and so hold the spring as covering the channel and preventing any substance from entering it.

It may be stated that under some circumstances the cleaner-casing may be dispensed with, especially when the valve-casing consists of a non-corrodible metal, in which instance the recesses will be formed in the wall of the channel into which the outer ends of the lugs 33 will engage.

The action or operation of the mechanism may be stated as follows: Assuming that the valves are in the upper position, as seen in Figs. 1 and 2 of the drawings, and it is desired to close the way, the valves are moved down by the action of the threaded stem until the lower end of the vertical valve engages the bow-spring, and then by continuing the movement the cleaner is carried down with the valve-block to the limit, when the lugs of the spring engage the recesses in the valve and there remain until the valve is lifted. When the valve is lifted, it raises the cleaner with it until the lateral openings in the cleaner-casing are reached, when the lugs are moved therein and released from the valve, which may then be raised to the upper position.

When the cleaner has been raised as indicated in Fig. 1, it stands as a guard bridging the channel and prevents the lodgment of any matter which in the absence of the guard or cleaner would find its way into the channel.

It may be desirable or essential to mount the casing in inverted position, in which position during the movement of the inclined valve it might slip in its connection to the valve-block, and to prevent this I form in the cap or head 4 a vertical rib 35, against which the edge of the inclined valve bears and is kept in proper relative position.

Having thus described my invention, what I claim is—

1. The combination with a valve-casing and a valve-cleaning device therein normally disconnected from the valve, of a valve, and means of engagement between the valve and said device to move the latter with the valve, during the opening movement of the latter.

2. The combination with the casing formed with a transverse channel therein, and a vertically-movable valve, of a cleaner in said channel, and means of engagement between the valve and the cleaner to move the latter downward during the closing movement of the valve, and to raise it during the opposite movement thereof, together with means to automatically detach the cleaner from the valve at the proper time.

3. The combination with the valve-casing formed with a transverse channel, and a vertically-movable valve, of a cleaner arranged in the channel in the path of the valve and comprising a bow-shaped spring provided with lugs at its free ends to detachably engage the valve and be lifted thereby.

4. The combination with the valve-casing formed with a transverse channel, and a vertically-movable valve, of a U-shaped cleaner-casing posited in the channel, a resilient cleaner disposed in the cleaner-casing in the path of the valve and having inclined lugs on its upwardly-extending ends to engage through the cleaner-casing and hold the cleaner in upper position and adapted to be depressed and lifted by the valve.

5. The combination with the valve-casing formed with a transverse channel, and a vertically-movable valve, of a cleaner posited in the channel and adapted to be raised and lowered therein by the valve, and means to hold it in such raised or lowered positions.

6. The combination with the valve-casing formed with a transverse channel, and a vertically-movable valve, of a U-shaped cleaner arranged in the channel and comprising a bow-spring having vertical arms formed with inclined lugs on the ends of the arms extending in opposite directions and adapted to engage the valve with their inner ends and be moved into engagement therewith by the engagement of their outer ends with the walls of the valve-casing.

7. In a straightway valve, the combination of the valve-casing formed with an inclined valve-seat, and a trap below the inclined seat, and a vertical valve-seat, and having a transverse channel contiguous to the vertical valve-seat, a valve-block having an inclined face and a vertical face, a valve detachably secured to the inclined face, and a valve-plate secured to the vertical face, a resilient cleaner disposed in the transverse channel and adapted to be positively raised and lowered by the movement of the vertical valve-plate.

8. In a straightway valve the combination of the valve-casing formed with an inclined valve-seat, and a trap below the inclined seat, and a vertical valve-seat, and having a transverse channel contiguous to the vertical valve-seat, a valve-block having an inclined face and a vertical face, a valve detachably secured to the inclined face, and a valve-plate secured to the vertical plate, a cleaner-casing disposed in the transverse channel and formed with vertical arms having lateral openings through their upper end portions, a U-shaped resilient cleaner arranged in said casing and bridging the same having inclined lugs at its upper ends to engage the vertical valve, whereby the cleaner is raised and lowered.

9. In a straightway valve, the combination of the valve-casing provided with an inclined valve-seat and a vertical valve-seat, a valve-block having an inclined face, and a vertical face coincident with said valve-seats, and a valve loosely mounted on said inclined face of said block; the said vertical and inclined faces being so disposed that the vertical face will close the port in advance of the engagement of the loose valve with its seat, whereby the flow of water may be arrested before the seating of the loose valve.

10. A straightway valve comprising a valve-casing formed with a vertical valve-seat and an inclined seat, a valve-block formed with a vertical and an inclined face provided with a locking-slot therein, a valve formed with a locking-lug to engage the locking-slot and hold it in an inclined position, and a valve-plate secured to the vertical face of the valve-block, means to raise and lower the valves, a depressible cleaner-spring arranged in the path of the vertical valve-plate and means on the spring to engage the said plate, whereby it will be lifted by the upward movement of the valve-plug.

In testimony whereof I affix my signature in the presence of two witnesses.

ALFRED G. OSGOOD.

Witnesses:
L. S. BLACK,
THEODORE DALTON.